(12) United States Patent
Noble

(10) Patent No.: US 11,598,102 B2
(45) Date of Patent: *Mar. 7, 2023

(54) PANEL SUPPORT SYSTEM AND METHOD

(71) Applicant: Pure Vista Ltd, Bodmin (GB)

(72) Inventor: Angus Noble, Totnes (GB)

(73) Assignee: PURE VISTA LTD, Bodmin (GB)

(*) Notice: Subject to any disclaimer, the term of this patent is extended or adjusted under 35 U.S.C. 154(b) by 0 days.

This patent is subject to a terminal disclaimer.

(21) Appl. No.: 17/487,031

(22) Filed: Sep. 28, 2021

(65) Prior Publication Data

US 2022/0010559 A1  Jan. 13, 2022

Related U.S. Application Data

(62) Division of application No. 16/020,435, filed on Jun. 27, 2018, now Pat. No. 11,156,000.

(30) Foreign Application Priority Data

Jul. 21, 2017  (GB) ...................... 1711733

(51) Int. Cl.
*E04F 11/18* (2006.01)
*F16B 11/00* (2006.01)

(52) U.S. Cl.
CPC ...... *E04F 11/1851* (2013.01); *E04F 11/1812* (2013.01); *F16B 11/006* (2013.01)

(58) Field of Classification Search
CPC ............... E04F 11/1834; E04F 11/1812; E04F 11/1853; E04F 11/1851; E04F 11/1817; E04B 2/82

See application file for complete search history.

(56) References Cited

U.S. PATENT DOCUMENTS

| 3,523,994 A | 8/1970 | Shockey | |
| 4,920,717 A * | 5/1990 | Hooper, Jr. | E04F 11/1812 52/204.597 |
| 6,419,209 B1 * | 7/2002 | Shepherd | E04F 11/1851 256/65.01 |
| 6,517,056 B2 * | 2/2003 | Shepherd | E04F 11/1851 256/65.01 |
| 8,820,721 B1 * | 9/2014 | Poma | E04H 9/14 256/65.14 |
| 8,826,621 B2 | 9/2014 | Noble | |
| 9,127,474 B2 * | 9/2015 | Tinwala | E04F 11/1812 |

(Continued)

FOREIGN PATENT DOCUMENTS

| EP | 3318693 A1 | 5/2018 | |
| GB | 2490642 A * | 11/2012 | E04F 11/1812 |

(Continued)

*Primary Examiner* — Rodney Mintz
(74) *Attorney, Agent, or Firm* — Crose Law LLC; Bradley D. Crose

(57) ABSTRACT

It is known to secure a panel 1 within a trough 3 by placing one edge of the panel 1 within the trough 3 and filling the trough with resin 21. Once hardened, the resin 21 holds the panel 1 in place securely. However, panels 1 thus secured cannot be removed easily if damaged. The present invention provides a barrier 11, 13 for preventing flow of liquid resin 21 along a length of a trough 3, and for receiving a panel 1 thereon. A panel 1 may therefore be secured within a trough 3 with a reduced amount of resin 21.

6 Claims, 15 Drawing Sheets

(56) References Cited

U.S. PATENT DOCUMENTS

| | | | |
|---|---|---|---|
| 9,617,736 B2* | 4/2017 | Zhou | E04F 11/1812 |
| 9,657,760 B2* | 5/2017 | Giacometti | F16B 5/0685 |
| 9,816,276 B2 | 11/2017 | Noble | |
| 9,920,781 B2* | 3/2018 | Barnes | F16B 5/0614 |
| 10,030,393 B2* | 7/2018 | Spence | E04F 11/1812 |
| 10,557,270 B2* | 2/2020 | Groeneweg | E04F 11/18 |
| 10,640,985 B2* | 5/2020 | Strehlow | E04F 11/1817 |
| 10,718,117 B2* | 7/2020 | Noble | E04F 11/1834 |
| 10,830,264 B2 | 11/2020 | Dagand | F16B 2/14 |
| 10,883,274 B1* | 1/2021 | Cocks | E06B 3/5454 |
| 11,053,688 B2* | 7/2021 | Ravan | E04F 11/1853 |
| 11,149,852 B2* | 10/2021 | Noble | F16J 15/061 |
| 11,156,000 B2* | 10/2021 | Noble | E04F 11/1851 |
| 11,220,823 B2* | 1/2022 | Bieler | E04F 11/1812 |
| 11,459,766 B2* | 10/2022 | Seeboth | E04F 11/1846 |
| 2001/0025953 A1* | 10/2001 | Shepherd | E04F 11/1853 256/24 |
| 2013/0036680 A1* | 2/2013 | Noble | E04F 11/1851 52/126.4 |
| 2015/0197959 A1* | 7/2015 | Tinwala | E04F 11/1853 256/24 |
| 2015/0240851 A1* | 8/2015 | Giacometti | E04F 11/1853 403/374.1 |
| 2015/0267415 A1* | 9/2015 | Zhou | E04F 11/1853 52/208 |
| 2016/0265232 A1* | 9/2016 | Noble | E04F 11/1853 |
| 2016/0281366 A1* | 9/2016 | Spence | E04F 11/1853 |
| 2017/0058928 A1* | 3/2017 | Barnes | E04F 11/1812 |
| 2017/0101784 A1* | 4/2017 | Gonzato | E04F 11/1853 |
| 2017/0370108 A1* | 12/2017 | Groeneweg | E04F 11/1836 |
| 2018/0135669 A1* | 5/2018 | Dagand | F16B 2/14 |
| 2019/0024380 A1* | 1/2019 | Noble | E04F 11/1851 |
| 2019/0177973 A1* | 6/2019 | Mitrovic | E04B 2/7401 |
| 2019/0218786 A1* | 7/2019 | Bieler | E04F 11/1853 |
| 2019/0249442 A1* | 8/2019 | Strehlow | E04F 11/1851 |
| 2019/0301168 A1* | 10/2019 | Noble | E04F 11/1812 |
| 2020/0011420 A1 | 1/2020 | Noble | |
| 2020/0087919 A1* | 3/2020 | Ravan | E04F 11/1812 |
| 2020/0109568 A1* | 4/2020 | Downs | E04F 11/1812 |
| 2020/0347610 A1* | 11/2020 | Rahikka | E04F 11/1834 |
| 2021/0172178 A1 | 6/2021 | Seeboth | |
| 2022/0127856 A1* | 4/2022 | Chapel | E04F 11/1812 |
| 2022/0195734 A1* | 6/2022 | Giacometti | E04F 11/1853 |

FOREIGN PATENT DOCUMENTS

| | | | | |
|---|---|---|---|---|
| JP | 402279859 A | 11/1990 | | |
| JP | 362117968 A | 6/1991 | | |
| KR | 20130013924 | 7/2011 | | |
| WO | WO 2011/095779 | 8/2011 | | |
| WO | WO 2015/145477 A1 | 10/2015 | | |
| WO | WO-2016024299 A1 * | 2/2016 | | E04F 11/1812 |
| WO | WO 2016/164144 | 10/2016 | | |

* cited by examiner

PANEL SUPPORT SYSTEM AND METHOD

CROSS-REFERENCE TO RELATED APPLICATION(S)

The present non-provisional patent application is a divisional application of Ser. No. 16/020,435, filed Jun. 27, 2018, which is entitled "PANEL SUPPORT SYSTEM AND METHOD", which is incorporated in full by reference herein.

Application Ser. No. 16/020,435 claims the benefit of priority of GB Patent No. 1711733.4, filed Jul. 21, 2018, which is entitled "PANEL SUPPORT SYSTEM AND METHOD", which is incorporated in full by reference herein.

FIELD OF THE INVENTION

The present invention relates generally to panel support systems and a method of supporting panels and finds particular, although not exclusive, utility in positioning and installing flat panels.

BACKGROUND OF THE INVENTION

Panels, in particular flat panels, are often made of glass, acrylic, metal, plastics material and/or other hard materials. Such panels may comprise two opposing faces, which may be flat or may be curved, regular or irregular, and a perimeter wall joining the two opposing faces. The perimeter wall may comprise a base.

It is known to secure a panel within a trough by placing one edge of the panel (e.g. the base) within the trough and filling the trough with resin. Once hardened, the resin holds the panel in place securely. However, panels thus secured cannot be removed easily if damaged.

BRIEF SUMMARY OF THE INVENTION

According to a first aspect of the present invention, there is provided a panel support system, comprising: a longitudinal trough having two opposing side walls and a base connected therebetween, the trough being open on a side opposing the base, the trough configured to be attachable to a surface; and at least one liquid resin retention unit configured to be placed in the trough, the or each liquid resin retention unit comprising at least one barrier configured to prevent liquid resin flowing along a length of the trough, the at least one liquid resin retention unit configured to receive a panel thereon.

The trough may be attached to a surface, the at least one liquid resin retention unit may be placed in the trough; the panel may be received on the at least one liquid resin retention unit; liquid resin may be introduced to one side of the at least one barrier; and the resin may be hardened.

In this way, a panel may be secured within a trough with a reduced amount of resin, for instance by only applying resin to one side of the barrier.

The resin may comprise natural plant resin and/or synthetic resin. The resin may comprise a thermosetting plastics material, for example (poly) methyl methacrylate. The resin may comprise a first one of two monomers in a copolymer, the second one of the two monomers may comprise a hardener, for example the resin may comprise a polyester and/or epoxy resin.

The panel support system may comprise a plurality of liquid resin retention units, and/or the or each liquid resin retention unit may comprise a plurality of barriers. In this way, a panel may be secured within a trough with a reduced amount of resin, for instance by only applying resin between two adjacent barriers (whether in a single liquid resin retention unit, or in/inbetween adjacent liquid resin retention units).

The or each liquid resin retention unit may comprise a pair of barriers. The or each liquid resin retention unit may be configured such that a cover extends between the pair of barriers. In this way, resin introduced into the liquid resin retention unit may be concealed by the cover to prevent mess and/or contaminants.

The or each liquid resin retention unit may further comprise a resin inlet, for introduction of resin into the unit therethrough. The resin inlet may be provided in the cover and/or at least one of the barriers. The inlet may comprise a hole. The inlet may comprise a tube; the tube may be removable after use, for instance be breaking/cutting off.

The or each liquid resin retention unit may comprise a trough engaging part, and a panel engaging part configured to be movable relative to the trough engaging part. The trough engaging part may be configured to engage with the base and two opposing side walls of the trough, and/or to be spaced (or at least spaceable) from the panel. The panel engaging part may be configured to engage with a base and two opposing side walls of the panel. In this way, resin may be held by the at least one liquid resin retention unit at a variety of panel inclinations. That is, the inclination of the panel may be adjusted within the trough (either before or after liquid resin has been introduced, but before the resin has hardened).

The liquid retention unit (an in particular the barrier and/or the cover) may comprise a flexible membrane. Alternatively or additionally, the liquid retention unit may comprise a joint and/or joint surface. The joint may be configured such that the barrier/cover comprises a trough barrier/cover portion and a panel barrier/cover portion. The joint may be a planar joint (e.g. having a trough plane and a panel plane), although other forms of joint such as hinged are also envisaged. The planar joint may be configured to allow movement of the panel plane in only one or only two translational degrees of freedom relative to the trough plane (e.g. parallel to the trough plane), and/or in only one rotational degree of freedom relative to the trough plane (about an axis perpendicular to the trough plane). The trough plane and panel plane may be substantially flat, or may have substantially the same curvature as one another.

The system may further comprise at least one clamp configured to hold the panel within the trough. In this way, the panel may be clamped in place while the resin is introduced into the retention unit. Optionally, the clamp may be removed after the resin has hardened.

The clamp may be configured to be able to hold the panel within the trough over a range of inclinations of the panel with respect to the trough. In this way, alignment of the panel may be selected and held before the panel is secured into position with the resin.

According to a second aspect of the present invention, there is provided a method of supporting a panel, the method comprising: providing the panel support system of the first aspect; attaching the trough to a surface; placing the at least one liquid resin retention unit in the trough; receiving the panel on the at least one liquid resin retention unit; introducing liquid resin to one side of the at least one barrier, and hardening the resin.

The method may further comprise the step(s) of: adjusting the alignment and/or inclination of the panel in the trough; and/or holding the panel in position within the tough while the resin hardens.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

DETAILED DESCRIPTION OF THE INVENTION

Figure 1:
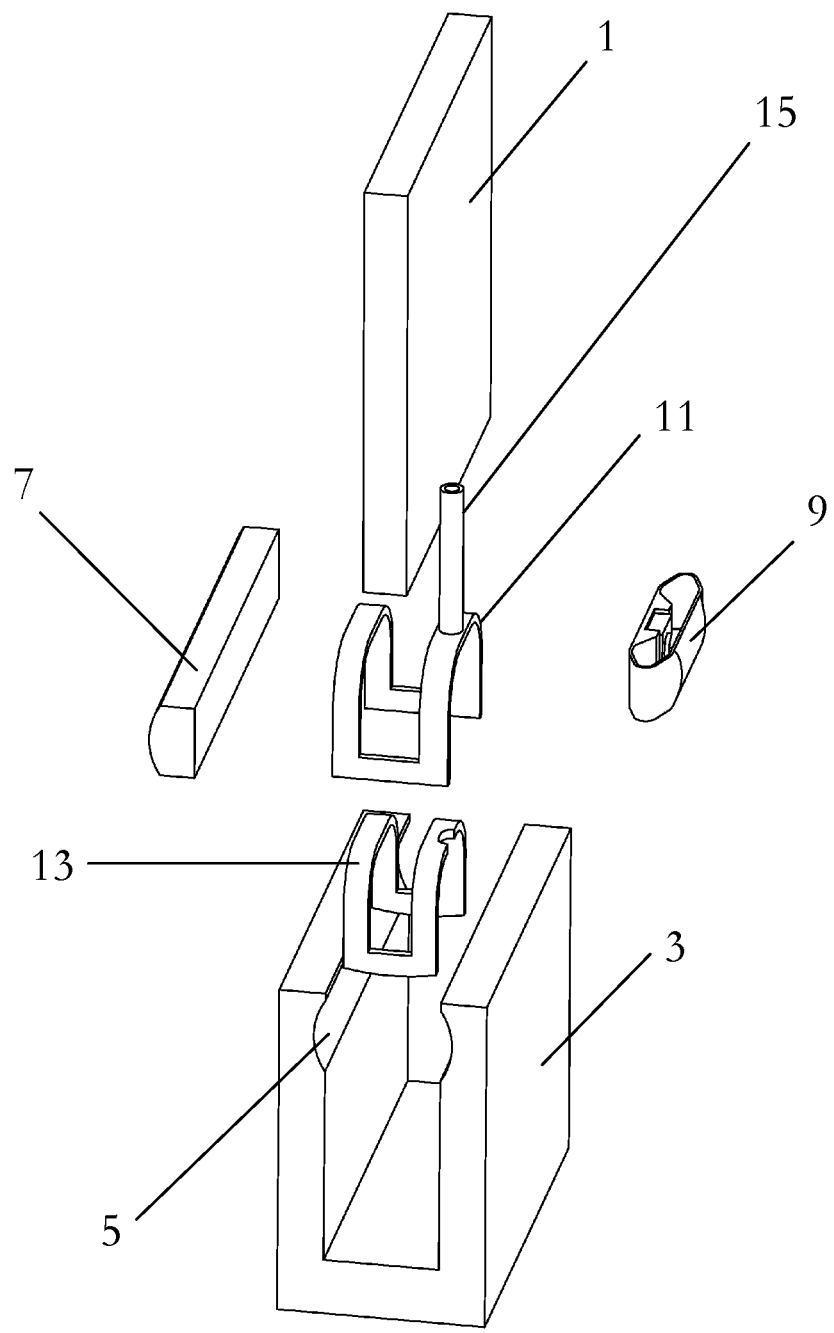
FIG. 1 is an exploded view of a panel support system.

The present invention will be described with respect to certain drawings but the invention is not limited thereto but only by the claims. The drawings described are only schematic and are non-limiting. Each drawing may not include all of the features of the invention and therefore should not necessarily be considered to be an embodiment of the invention. In the drawings, the size of some of the elements may be exaggerated and not drawn to scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that operation is capable in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that operation is capable in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Similarly, it is to be noticed that the term "connected", used in the description, should not be interpreted as being restricted to direct connections only. Thus, the scope of the expression "a device A connected to a device B" should not be limited to devices or systems wherein an output of device A is directly connected to an input of device B. It means that there exists a path between an output of A and an input of B which may be a path including other devices or means. "Connected" may mean that two or more elements are either in direct physical or electrical contact, or that two or more elements are not in direct contact with each other but yet still co-operate or interact with each other. For instance, wireless connectivity is contemplated.

Reference throughout this specification to "an embodiment" or "an aspect" means that a particular feature, structure or characteristic described in connection with the embodiment or aspect is included in at least one embodiment or aspect of the present invention. Thus, appearances of the phrases "in one embodiment", "in an embodiment", or "in an aspect" in various places throughout this specification are not necessarily all referring to the same embodiment or aspect, but may refer to different embodiments or aspects. Furthermore, the particular features, structures or characteristics of any embodiment or aspect of the invention may be combined in any suitable manner, as would be apparent to one of ordinary skill in the art from this disclosure, in one or more embodiments or aspects.

Similarly, it should be appreciated that in the description various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Moreover, the description of any individual drawing or aspect should not necessarily be considered to be an embodiment of the invention. Rather, as the following claims reflect, inventive aspects lie in fewer than all features of a single foregoing disclosed embodiment Thus, the claims following the detailed description are hereby expressly incorporated into this detailed description, with each claim standing on its own as a separate embodiment of this invention.

Furthermore, while some embodiments described herein include some features included in other embodiments, combinations of features of different embodiments are meant to be within the scope of the invention, and form yet further embodiments, as will be understood by those skilled in the art. For example, in the following claims, any of the claimed embodiments can be used in any combination.

In the description provided herein, numerous specific details are set forth. However, it is understood that embodiments of the invention may be practised without these specific details. In other instances, well-known methods, structures and techniques have not been shown in detail in order not to obscure an understanding of this description.

In the discussion of the invention, unless stated to the contrary, the disclosure of alternative values for the upper or lower limit of the permitted range of a parameter, coupled with an indication that one of said values is more highly preferred than the other, is to be construed as an implied statement that each intermediate value of said parameter, lying between the more preferred and the less preferred of said alternatives, is itself preferred to said less preferred value and also to each value lying between said less preferred value and said intermediate value.

The use of the term "at least one" may mean only one in certain circumstances.

The principles of the invention will now be described by a detailed description of at least one drawing relating to exemplary features of the invention. It is clear that other arrangements can be configured according to the knowledge of persons skilled in the art without departing from the underlying concept or technical teaching of the invention, the invention being limited only by the terms of the appended claims.

FIG. 1 is an exploded view of a system for supporting a panel 1. The system includes a U-shape channel for receiving a lower end of the panel 1 therein. Each side wall of the U-shape channel includes a longitudinal groove 5 thereon, having a substantially uniform curvature (i.e. having a substantially circular profile). Into each groove 5 may be placed a respective spacer.

The figure shows a fixed spacer 7 in the form of a block having a first exterior profile that matches the shape of the left groove 5 (i.e. is circular in cross-section) and an opposing exterior profile that matches the shape of the panel (shown flat in the figures). An adjustable spacer 9 is also provided on the opposite side of the panel, having a first exterior profile that matches the shape of the right groove 5 (i.e. is circular in cross-section) and an opposing exterior profile that matches the shape of the panel (shown flat in the figures).

The adjustable spacer 9 is configured such that the first exterior profile (for placement in the right groove 5) can be moved away from/toward the opposing exterior profile (for engaging with the panel 1). In this way, the panel 1 can be clamped in place by the spacers 7, 9, in particular by adjusting the adjustable spacer 9. Moreover, adjustment of the adjustable spacer 9, enables pivoting of the panel 1 within the channel 3, as will be described in more detail below.

The panel 1 sits on a retention unit within the channel 3. The retention unit comes in two parts: an outer 11 shaped to conform to the interior profile of the channel 3; and an inner 13 shaped to conform to the exterior profile of the panel 1. The outer 11 and inner 13 parts of the retention unit are mutually configured for a snug fit with one another, to prevent escape of liquid resin therebetween. An inlet 15 is provided atop the retention unit, to allow introduction of liquid resin into the retention unit.

Figure 2:
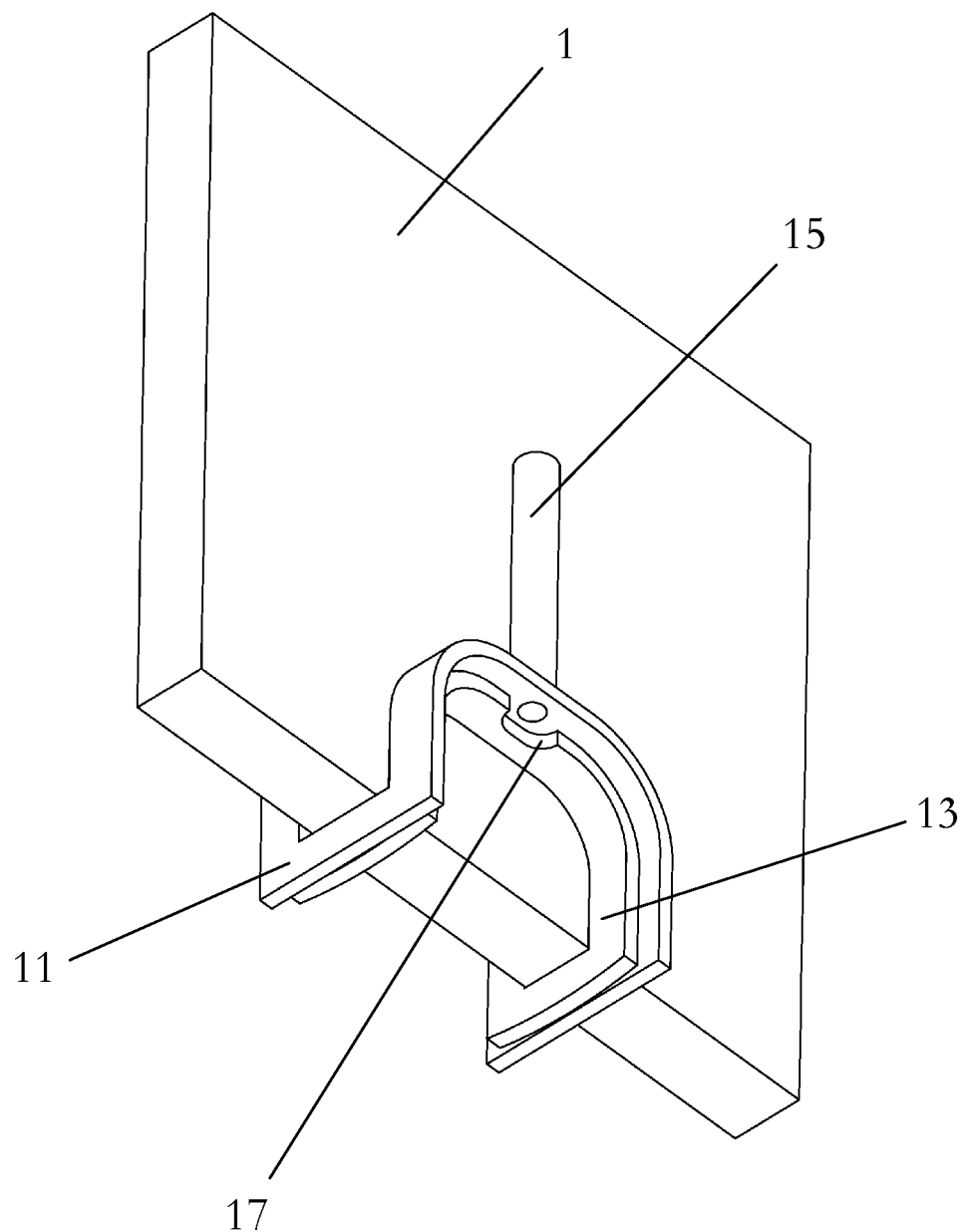
FIG. 2 is a perspective view of the underside of part of the system shown in FIG. 1.

FIG. 2 is a perspective view of the panel 1 installed on the retention unit 11, 13. A cut-out 17 in the inner 13 ensures that the inner 13 does not obstruct introduction of liquid resin into the unit via the inlet 15.

Figure 3:
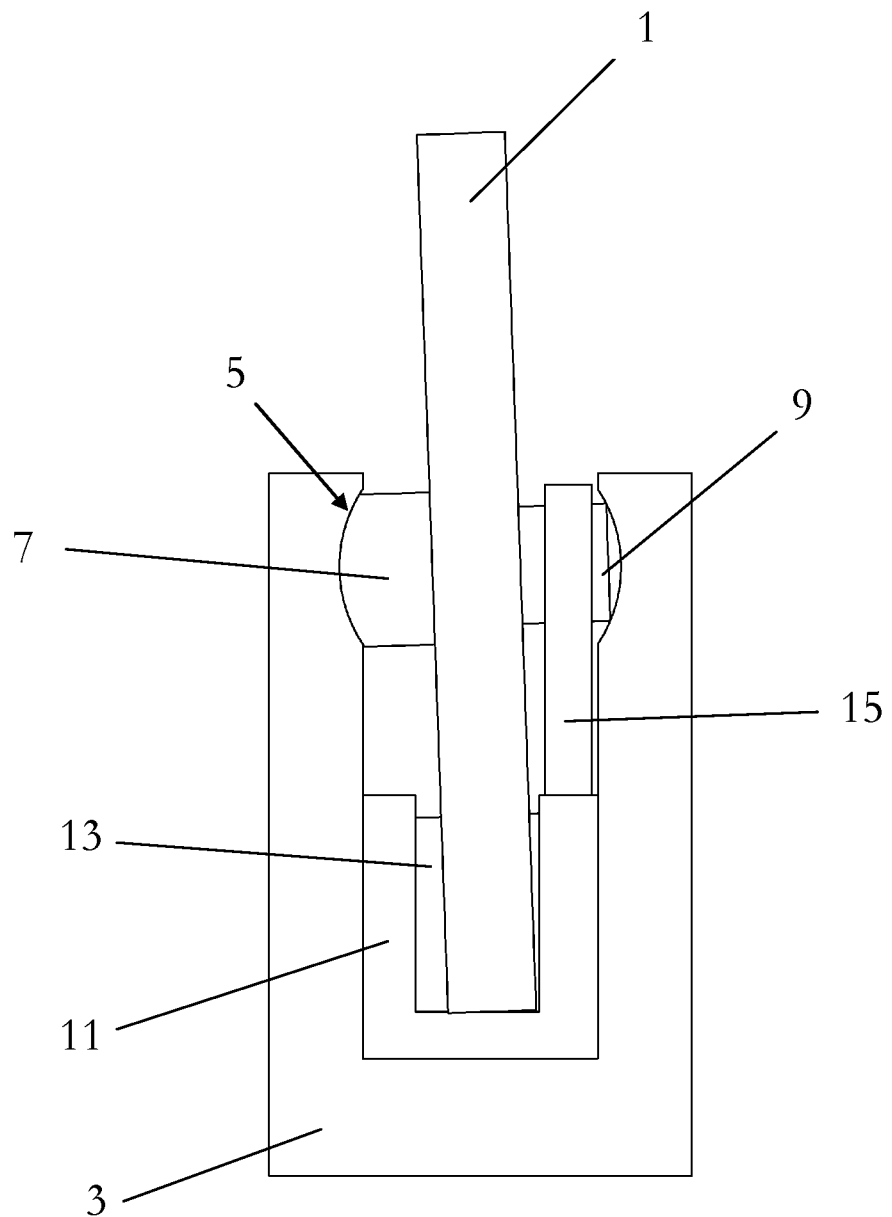
FIG. 3 is an end-on view of the system of FIG. 1, with the panel tilted to the left.

FIG. 3 is an end-on view of the system of FIG. 1, with the panel 1 tilted to the left. As can be seen from the figure, the fixed spacer 5 has pivoted within the left groove 5 such that its panel-engaging face is tilted slightly upward. Similarly, the adjustable spacer 9 has pivoted within the right groove such that its panel-engaging face is tilted slightly downward.

The outer part 11 of the retention unit is secure in the base of the channel 3. However, the inner part 13 of the retention unit has moved and tilted to accommodate the tilted panel 1.

Figure 4:
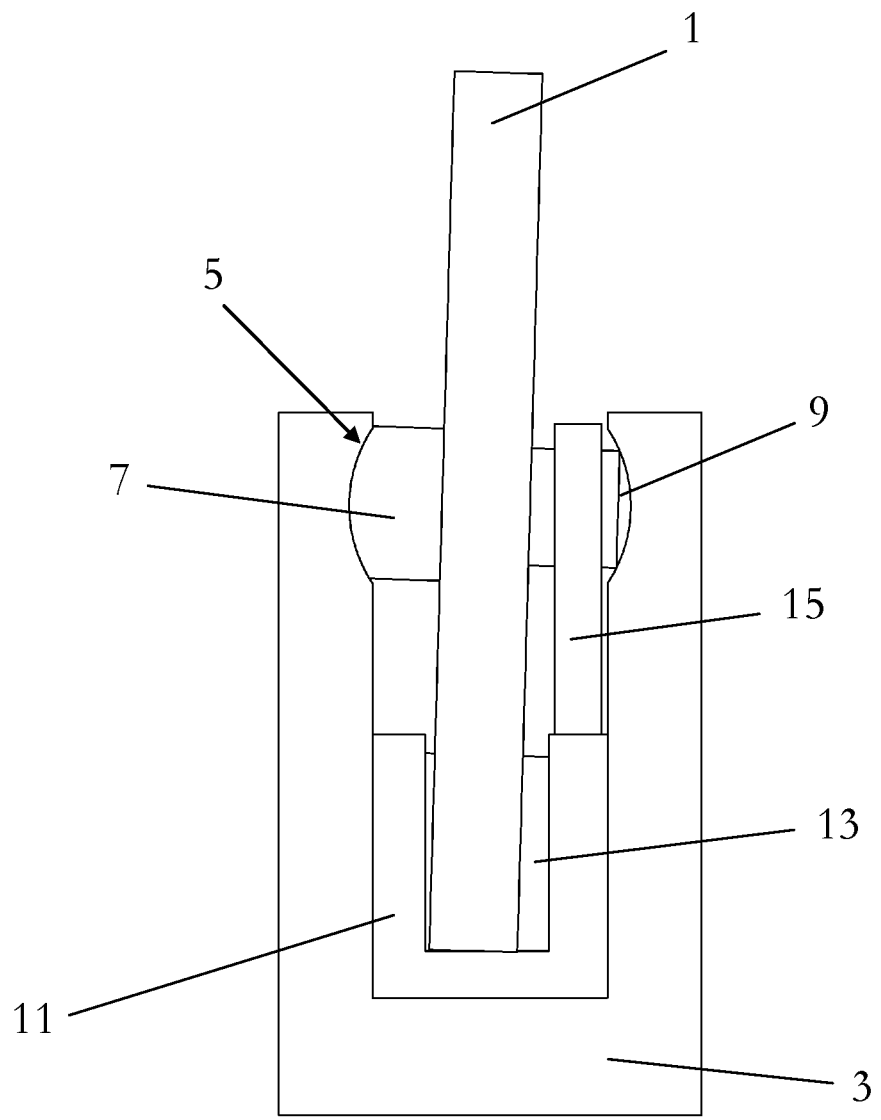
FIG. 4 is a similar view to that in FIG. 3, but with the panel tilted to the right.

FIG. 4 is a similar view to that in FIG. 3, but with the panel 1 tilted to the right. The outer part 11 is unchanged within the channel 3, but the position of the inner part 13 and the spacers 7, 9 can be seen to have changed.

Figure 5:
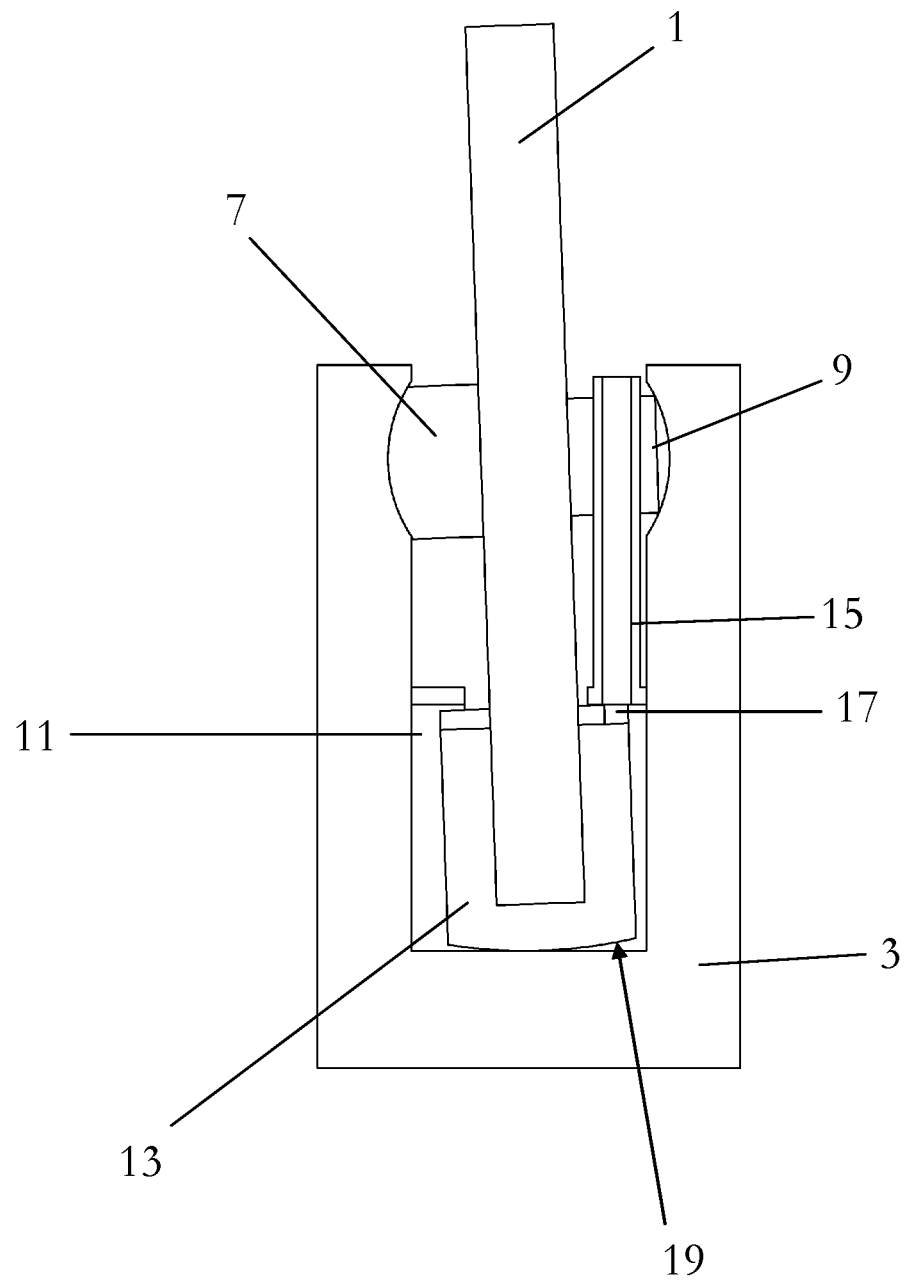
FIG. 5 is a sectional view through the inlet of the system of FIG. 1, with the panel tilted to the left.

FIG. 5 is a sectional view through the inlet of the system of FIG. 1, with the panel tilted to the left; it therefore shows a cross-sectional view similar to the end-on view of FIG. 3. As can be seen from this figure, the inner part 13 is provided with a curved base 19, for engaging a bottom of the channel 3, so that the inner part 13 may pivot on the bottom of the channel 3 while supporting the panel 1 thereon. the cut-out 17 is shown aligned with the inlet 15.

Figure 6:
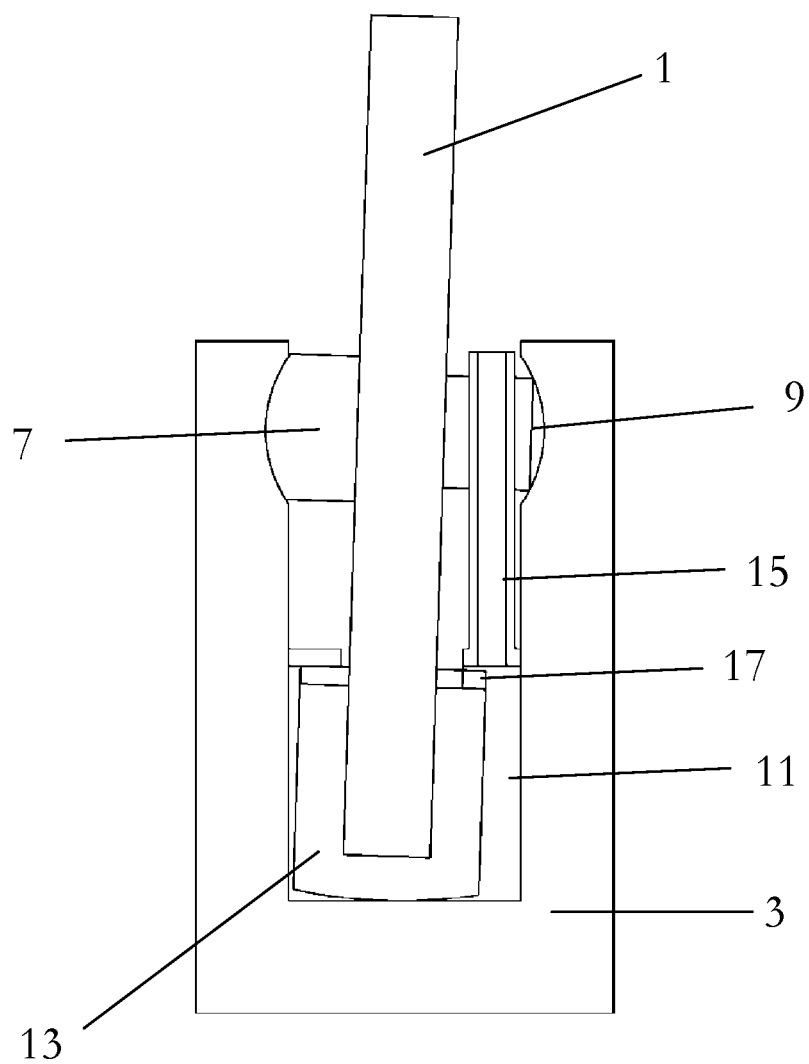
FIG. 6 is a similar view to that in FIG. 5, but with the panel tilted to the right.

FIG. 6 is a similar view to that in FIG. 5, but with the panel tilted to the right. The different position of the inner part 13 is more apparent in this figure than in FIG. 4 discussed above.

Figure 7:
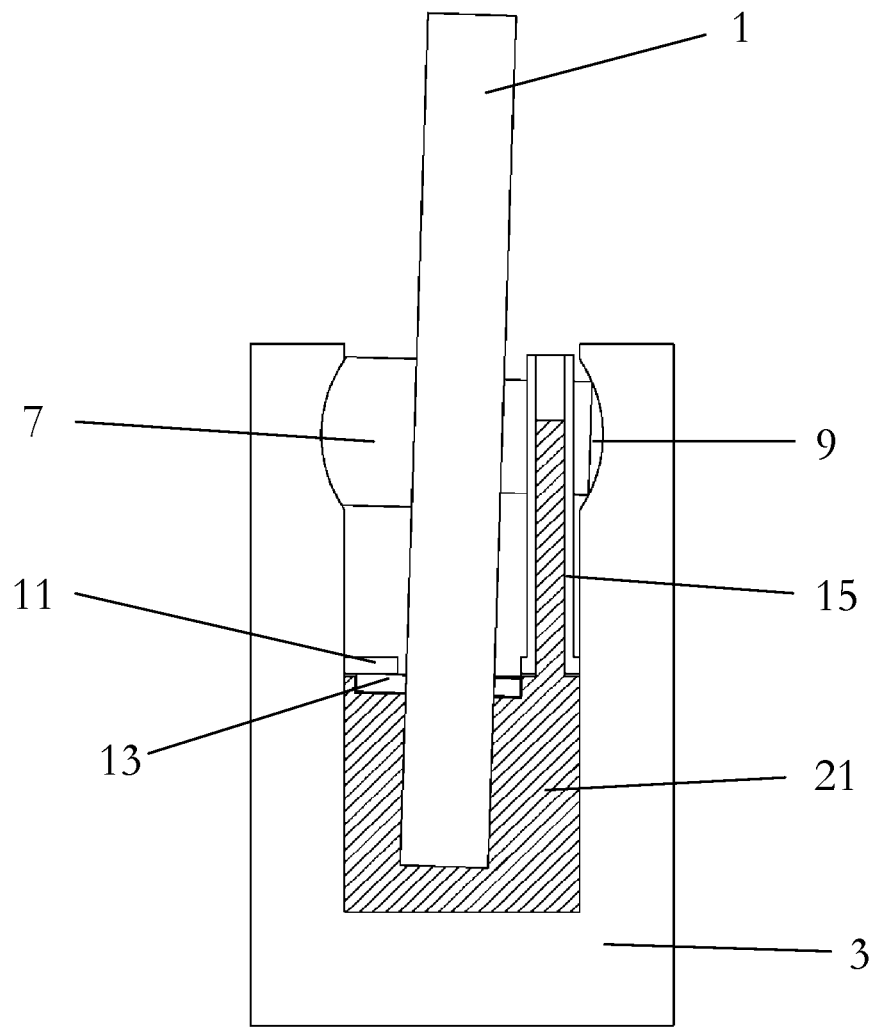
FIG. 7 is a similar view to that in FIG. 6, but with liquid resin having been introduced.

FIG. 7 is a similar view to that in FIG. 6, but with liquid resin 21 having been introduced. As can be seen from the figure, the resin is introduced via inlet 15 and flows around a first side of the panel, underneath the panel, and then around an opposing side of the panel opposite the first side; however, the resin is retained between the retention unit to prevent flow along the trough. The resin itself flows into contact with both the trough and the panel, to bind them together securely; the retention unit prevents the resin flowing along the trough away from the desired fixing position, and in this arrangement also prevents the resin leaking out of the opening of the trough, and/or fouling the surface of the panel above the desired fixing position.

Figure 8:
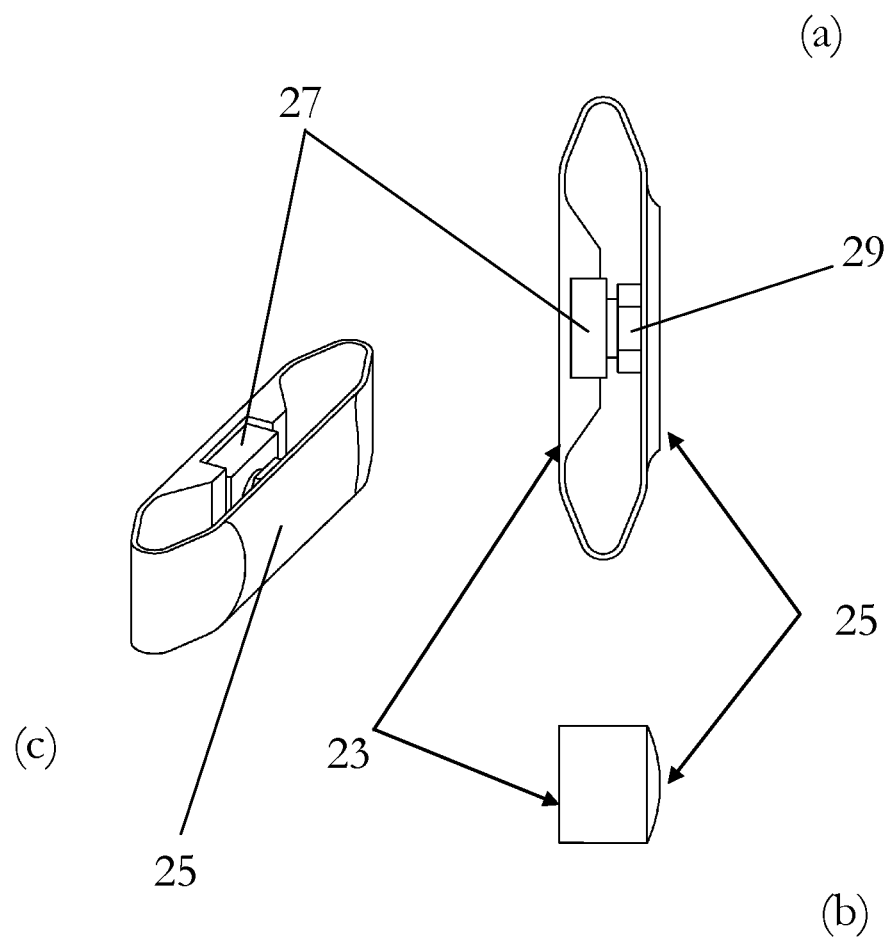
FIG. 8 shows detail of the expanding spacer shown in FIG. 1.

FIG. 8 shows detail of the adjustable spacer 9 from above (a), the side (b) and obliquely (c). The adjustable spacer 9 has a face with a flat profile 23, an opposing face with a circular profile 25, a nut 27 securely fixed to the flat profile face 23 and a bolt 29, threadably received within the nut 27, having a hexagonal head. By rotating the bolt 29 (e.g. with a spanner), the two faces 23, 25 may be moved toward or away from each other.

Figure 9:
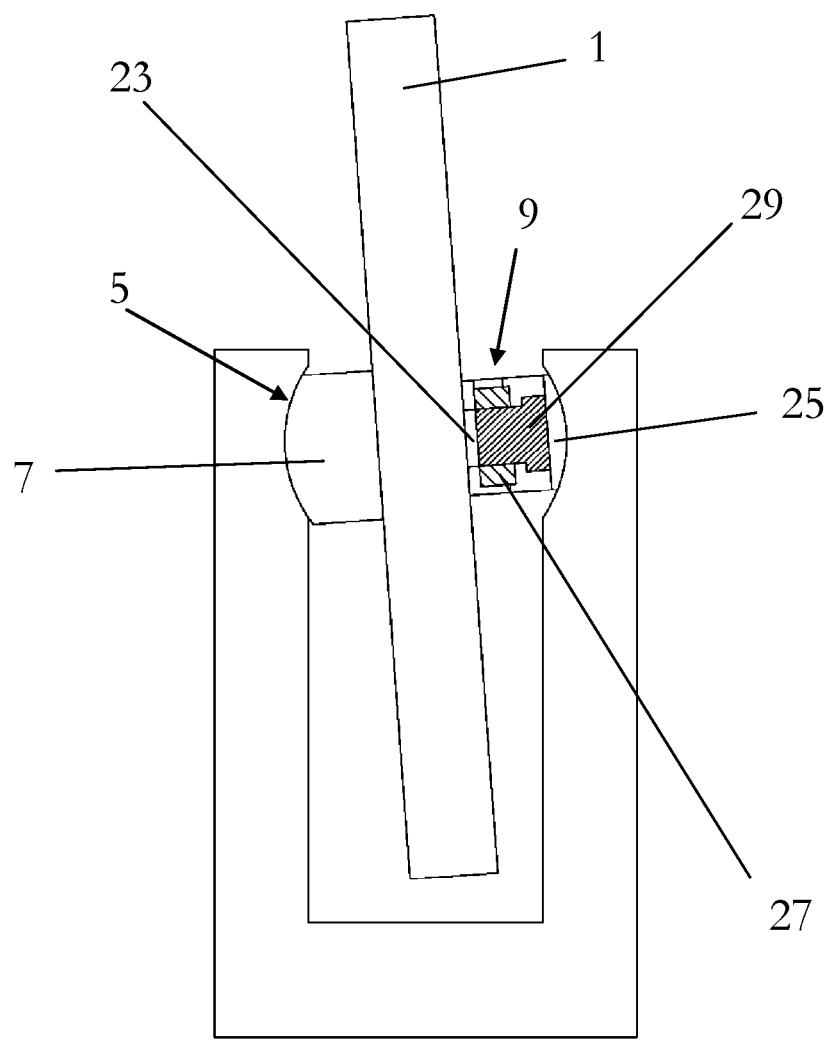
FIG. 9 is a sectional view through the expanding spacer of the system of FIG. 1, with the panel tilted to the left.

FIG. 9 is a sectional view through the expanding spacer of the system of FIG. 1, with the panel 1 tilted to the left. This cross-section avoids the retention unit, which is not shown. The panel 1 may be tilted to any desired orientation, and then affixed in position by the spacers 7, 9, which are able to pivot in their respective grooves 5.

Figure 10:
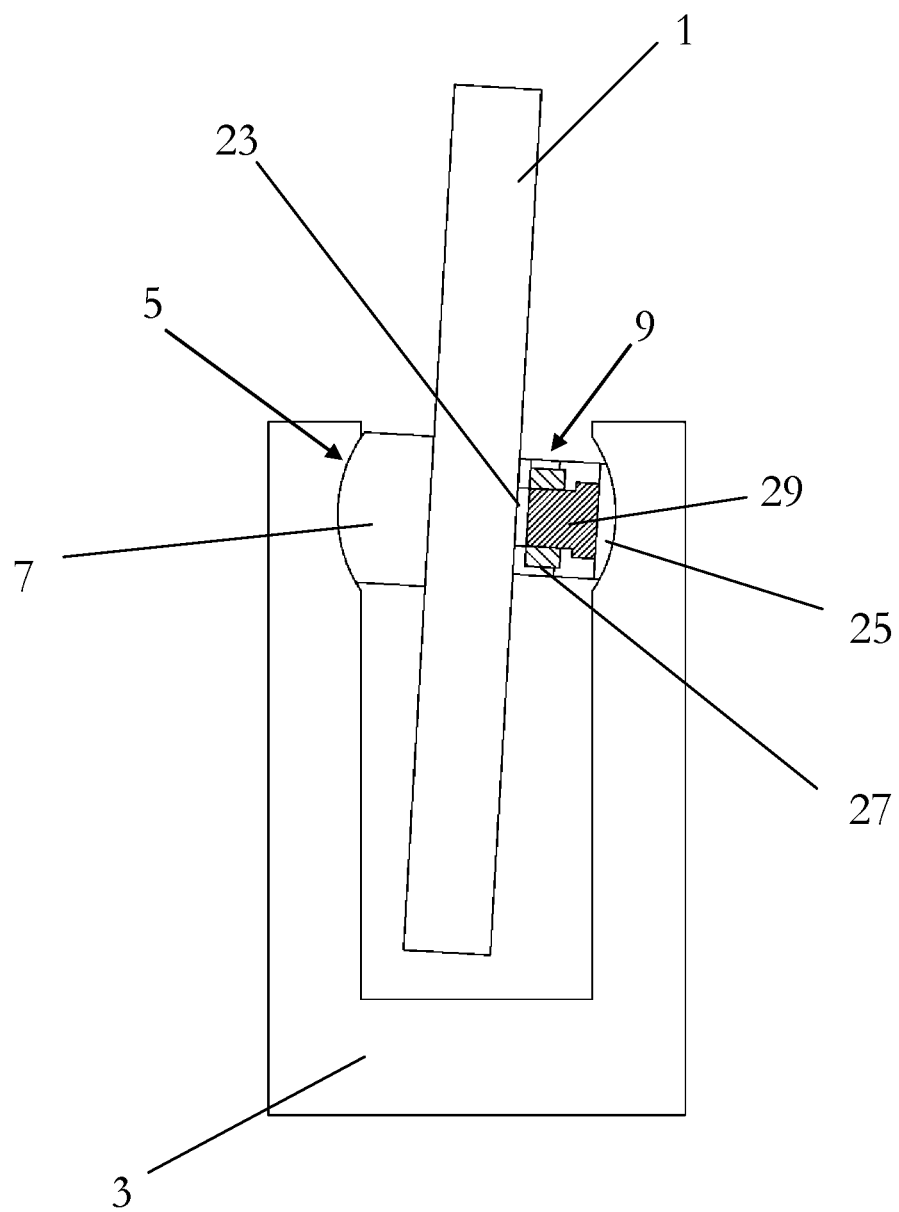
FIG. 10 is a similar view to that in FIG. 9, but with the panel tilted to the right.

FIG. 10 is a similar view to that in FIG. 9, but with the panel 1 tilted to the right.

Figure 11:
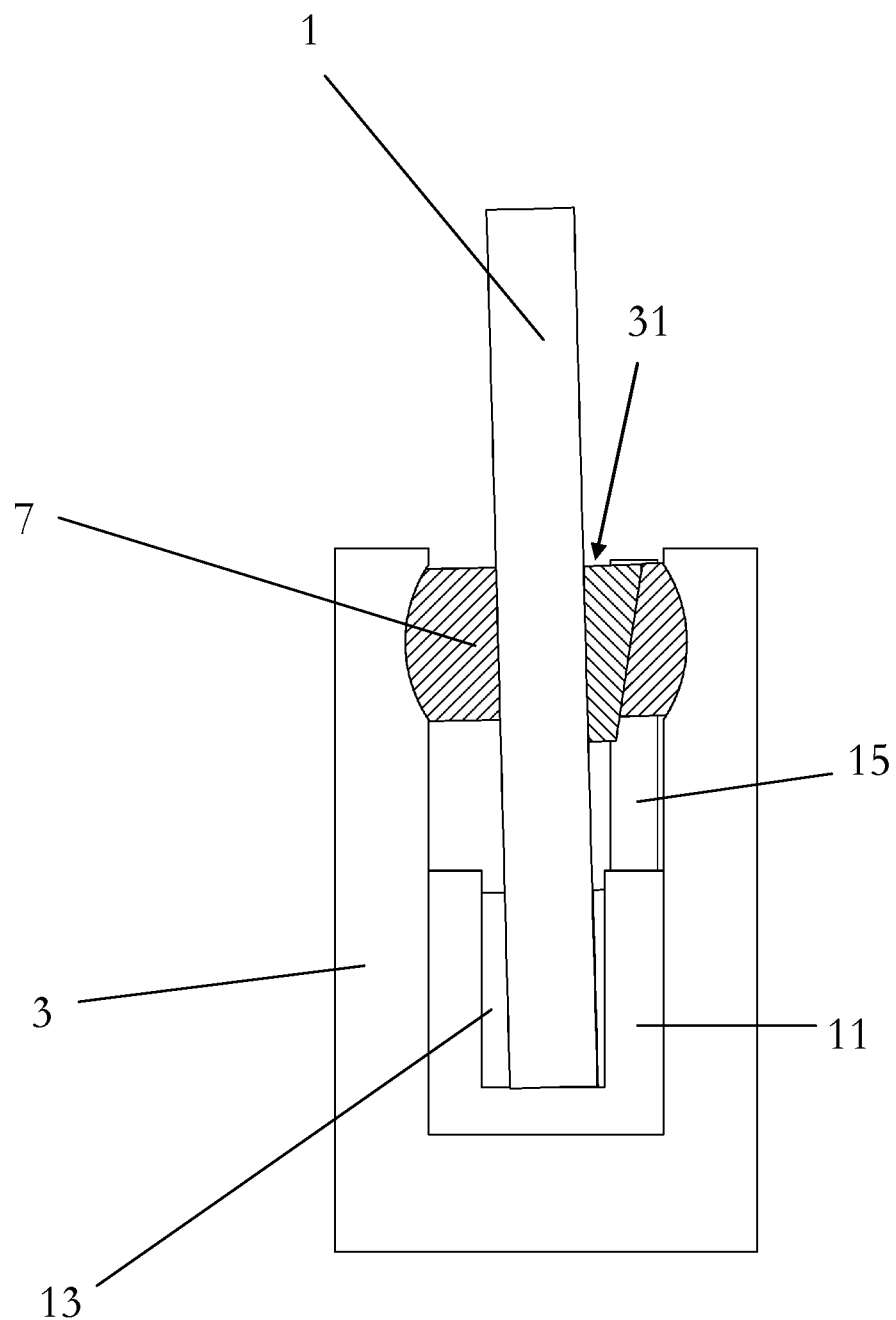
FIG. 11 is an end-on view of the system of FIG. 1, including an alternative/additional wedge system, with the panel tilted to the left.
Figure 12:
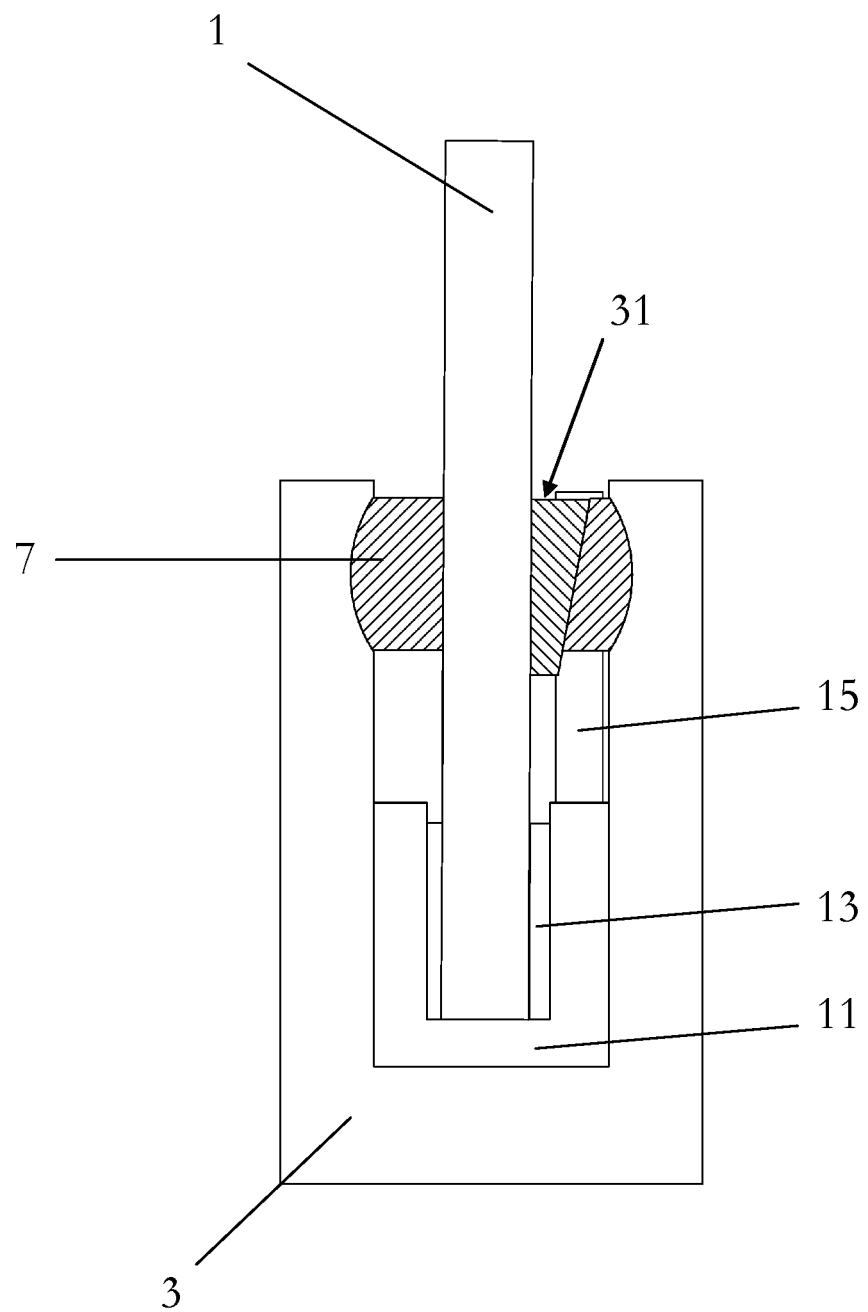
FIG. 12 is a similar view to that in FIG. 11, but with the panel tilted to the right.

Once the resin has hardened, the adjustable spacer 9 may (optionally) be removed from the channel 3 and replaced with a combination of wedges 31, as shown in FIG. 11. The combination of wedges may be chosen to prevent dust, debris or dirt from collecting in the channel, and can be easily removed as they are a purely friction fit. FIG. 12 is a similar view to that in FIG. 11, but with the panel 1 tilted to the right.

Figure 13:
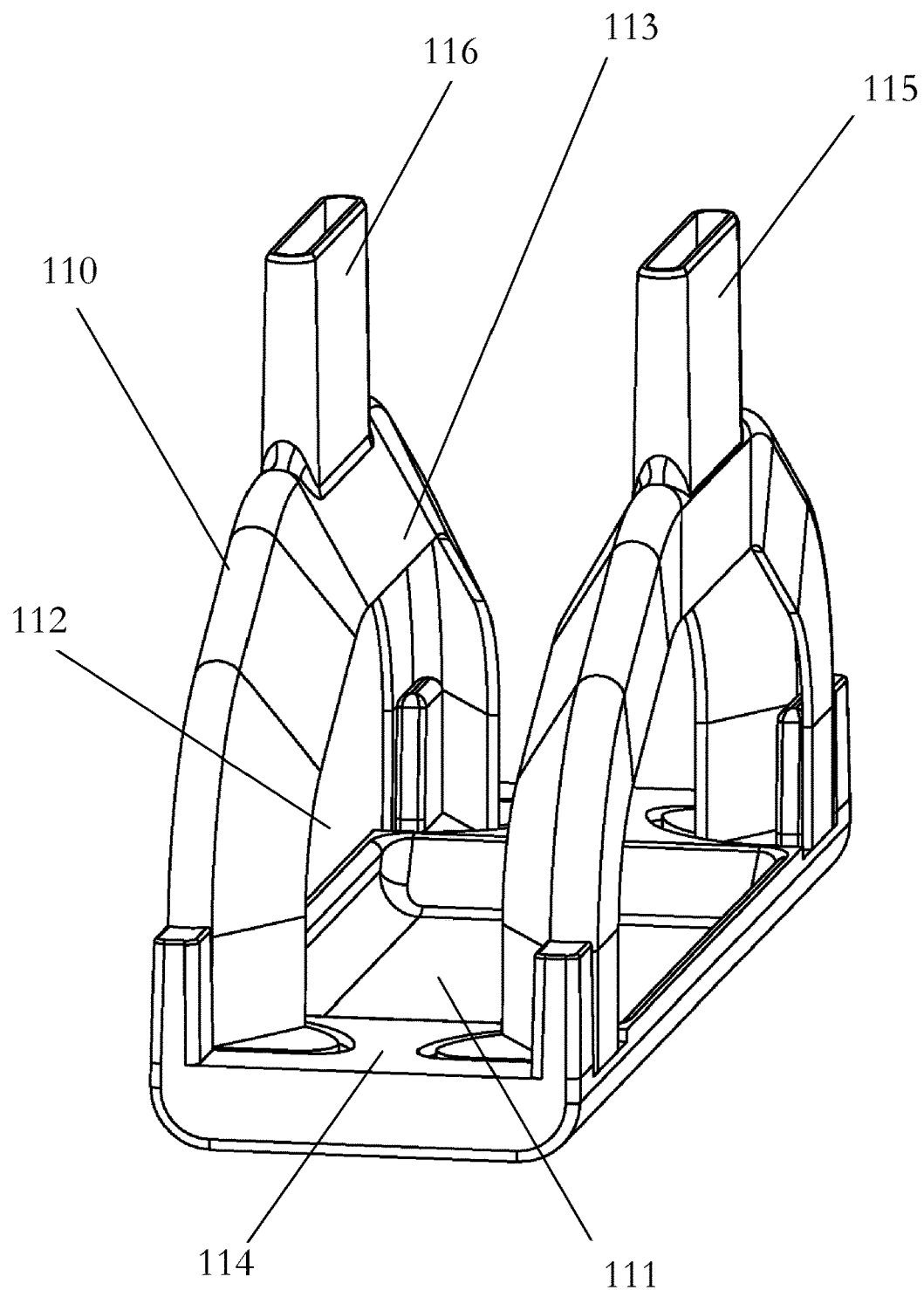
FIG. 13 is a perspective view of an alternative retention member.

FIG. 13 is a perspective view of an alternative retention member comprising a substantially rigid frame 110 shaped to conform to the interior profile of a trough (not shown) and an exterior profile of a panel (not shown). The frame includes an open base 111 (such that fluid therein may contact the base of the trough), open sides 112 (such that fluid therein may contact the walls of the trough), and an open interior region (such that fluid therein may contact the panel). The perimeter of the open base 111 and open sides 112 is provided with an optional flange to ensure an effective seal against flow of liquid resin out of the retention member. The perimeter of the open interior region comprises a substantially flexible and substantially resilient flange 113 configured to form a seal against flow of resin out of the retention member past a panel over a range of inclinations of the panel. The panel itself may be placed on an upper surface 114 of the retention member, which may itself also be substantially flexible and/or substantially resilient.

An inlet 115 is provided to allow liquid resin to be injected into the retention member. An outlet 116 is also provided to allow air to escape the resin retention member during liquid resin introduction. The outlet 116 may also act as a visual indicator to a user to show when sufficient introduction of liquid resin has been achieved.

Figure 14:
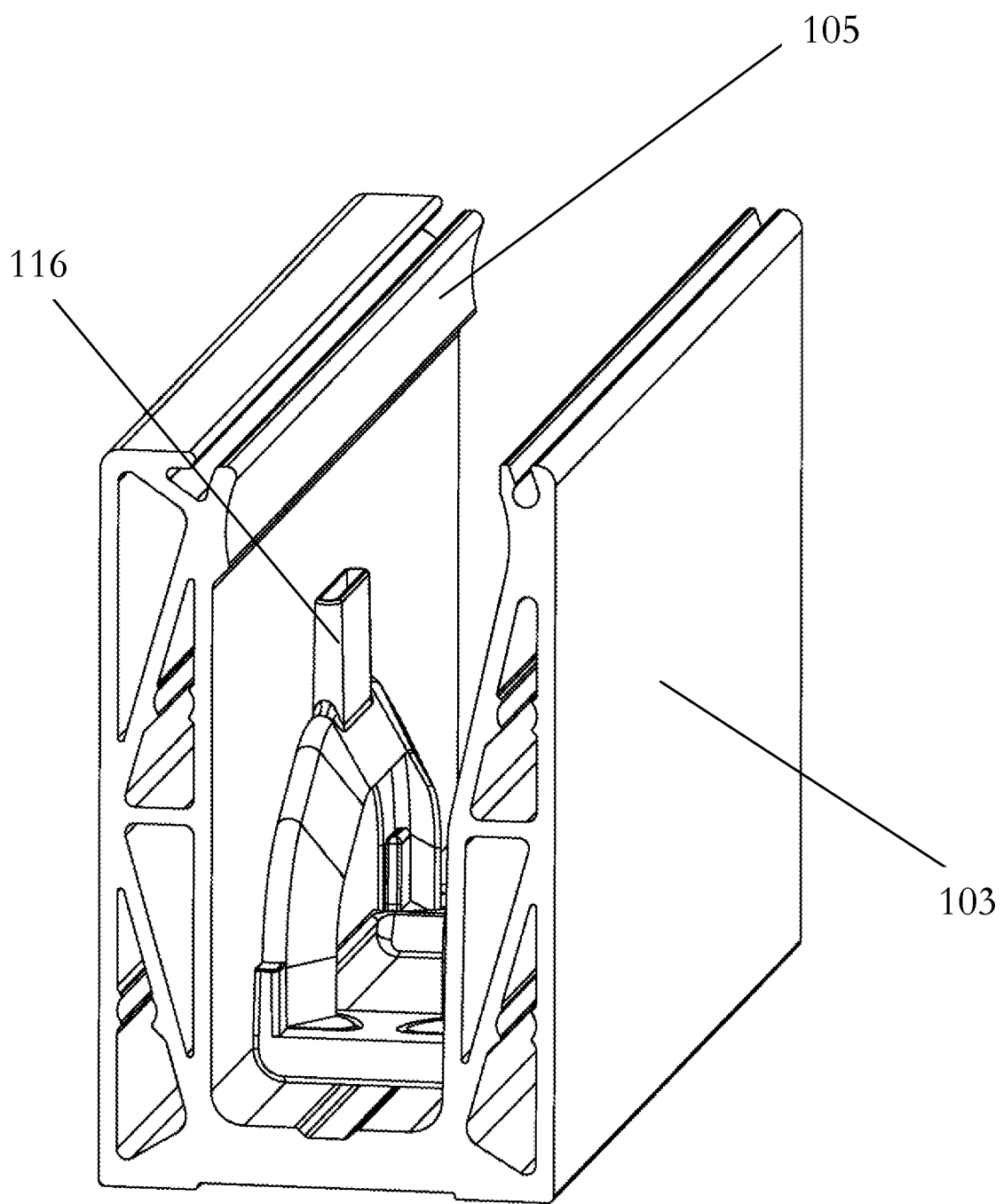
FIG. 14 is a perspective view of the retention member of FIG. 13 positioned in a trough.

FIG. 14 is a perspective view of the retention member of FIG. 13 positioned in a trough 103. The trough 103 is shown as hollow, as is conventional in the field. The trough comprises curved longitudinal grooves 105, similar to those grooves 5 shown in FIG. 1.

Figure 15:
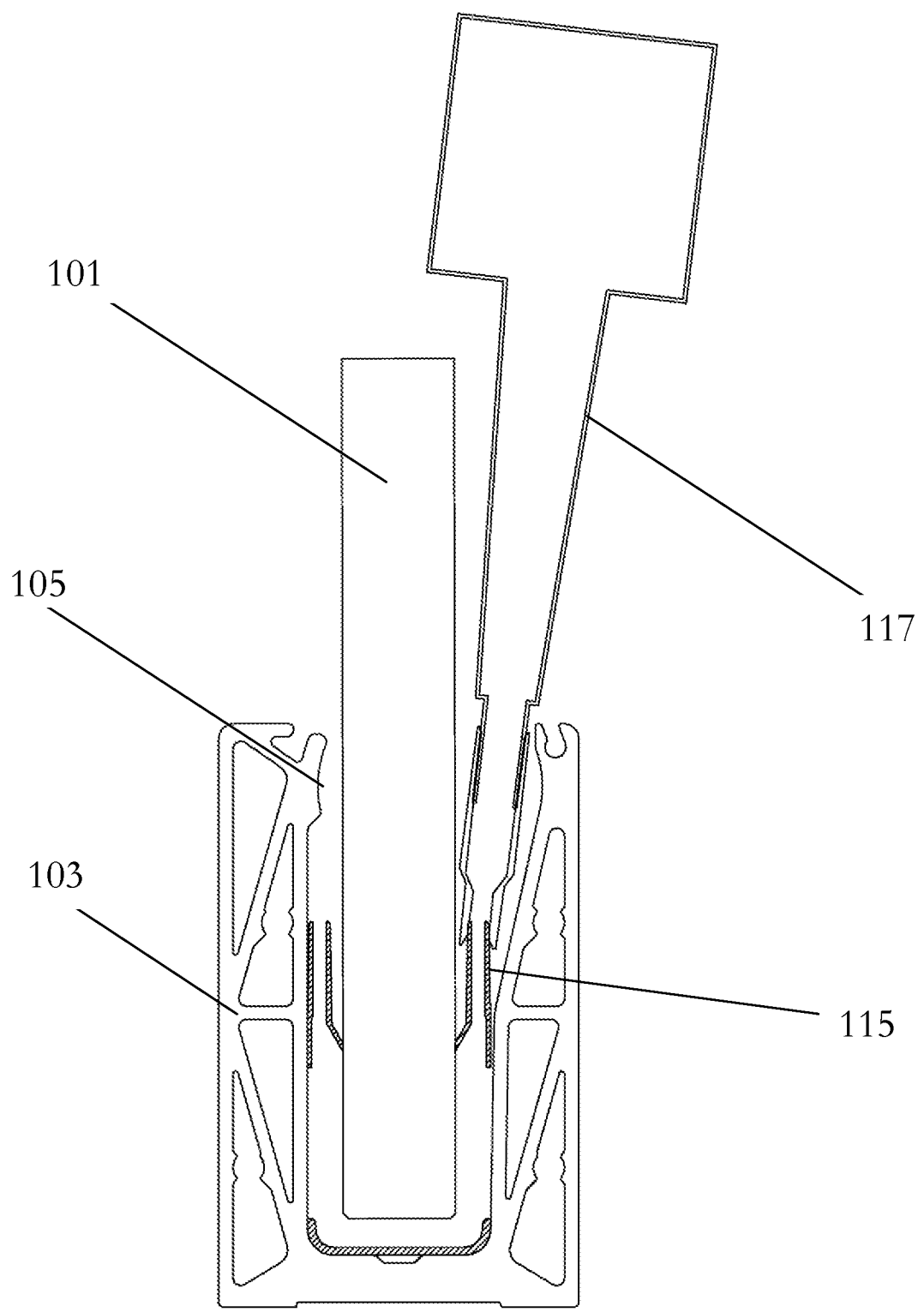
FIG. 15 is a cross-sectional view of the retention member of FIGS. 13 and 14 positioned in the trough with a panel received thereon, and having liquid resin injected therein.

FIG. 15 is a cross-sectional view of the retention member of FIGS. 13 and 14 positioned in the trough 103 with a panel 101 received thereon, and having liquid resin injected therein from a source 117.

The invention claimed is:

1. A panel support system, comprising:
    a longitudinal trough having two opposing side walls and a base connected therebetween, the trough being open on a side opposing the base, the trough configured to be attachable to a surface; and
    at least one liquid resin retention unit configured to be placed in the trough, the or each liquid resin retention unit comprising at least one barrier comprising a frame having an open interior region, the at least one liquid resin retention unit configured to receive a panel thereon;
    wherein the panel support system is arranged such that liquid resin introduced into the liquid resin retention unit flows into contact with both the trough and the panel to bind said trough and said panel together securely;
    wherein a perimeter of the open interior region comprises a substantially flexible and substantially resilient flange configured to form a seal against the flow of the liquid resin out of the liquid resin retention unit past the panel over a range of inclinations of the panel such that the at least one barrier prevents the liquid resin flowing along a length of the trough as a respective said inclination of the panel is adjusted within the trough.

2. The panel support system of claim 1, wherein the or each liquid resin retention unit comprises a pair of barriers.

3. The panel support system of claim 1, wherein the or each liquid resin retention unit further comprises a resin inlet, for introduction of the liquid resin into the unit therethrough.

4. The panel support system of claim 1, further comprising at least one clamp configured to hold the panel within the trough.

5. The panel support system of claim 4, wherein the clamp is configured to be able to hold the panel within the trough over the range of inclinations of the panel with respect to the trough.

6. A method of supporting a panel, the method comprising:
    providing the panel support system of claim 1;
    attaching the trough to said surface;
    placing the at least one liquid resin retention unit in the trough;
    receiving the panel on the at least one liquid resin retention unit;
    adjusting the respective inclination of the panel in the trough;
    introducing the liquid resin to one side of the at least one barrier; and
    hardening the liquid resin.

* * * * *